United States Patent [19]

Novinger

[11] 4,177,794
[45] Dec. 11, 1979

[54] EVACUATED-TUBE SOLAR COLLECTOR

[76] Inventor: Harry E. Novinger, 4961 S. Chester St., Englewood, Colo. 80111

[21] Appl. No.: 903,068

[22] Filed: May 5, 1978

[51] Int. Cl.² .............................................. F24J 3/02
[52] U.S. Cl. .......................... 126/443; 428/36; 126/449
[58] Field of Search .............. 126/270, 271; 237/1 A; 165/48, 18, DIG. 11; 428/36

[56] References Cited

U.S. PATENT DOCUMENTS

| | | | |
|---|---|---|---|
| 2,998,005 | 8/1961 | Johnston | 126/270 |
| 3,102,532 | 9/1963 | Shoemaker | 126/270 |
| 3,220,671 | 11/1965 | Ashman et al. | 126/270 |
| 4,026,273 | 5/1977 | Parker | 126/271 |
| 4,030,477 | 6/1977 | Smith | 126/270 |
| 4,067,316 | 1/1978 | Brin et al. | 126/270 |
| 4,082,082 | 4/1978 | Harvey | 126/270 |
| 4,094,299 | 6/1918 | Voelker | 126/270 |

*Primary Examiner*—James C. Yeung

[57] ABSTRACT

This invention provides for an unusually efficient, lightweight, economical and durable solar collector employing a fibrous absorber in an evacuated-tube type solar collector. The depth of the absorber, measured in centimeters more efficiently traps radiation than the shallow depth of a plate absorber surface. The fibers are arranged in irregular order with space for a fluid. Sufficient fiber mass is used to blanket all radiation. The absorber is disposed inside the inner tube of a two tube collector. The second tube fits about the inner tube in a manner that allows the space between the walls of the tubes to be evacuated of air. A reflector may be disposed inside the lower half of the outer tube to improve efficiency. A fluid enters one end of the collector and passes via ducts through the absorber conducting heat from the highly radiation absorptive fibers and exits the other end. The fiber may be compressed to opacity and a tube fitted within the ducts for the heating of another fluid in the tube.

12 Claims, 6 Drawing Figures

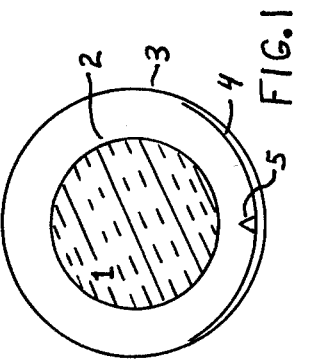
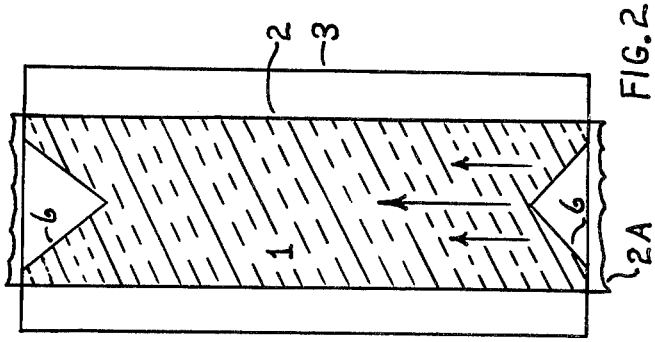
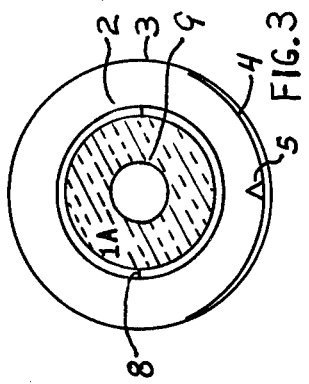
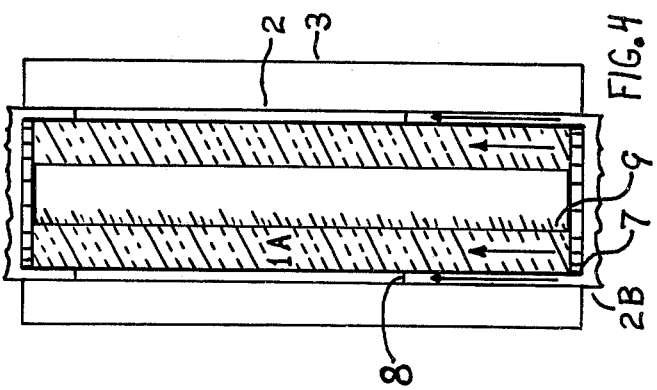
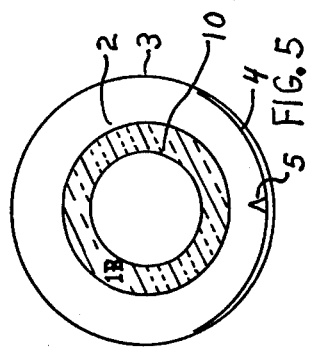
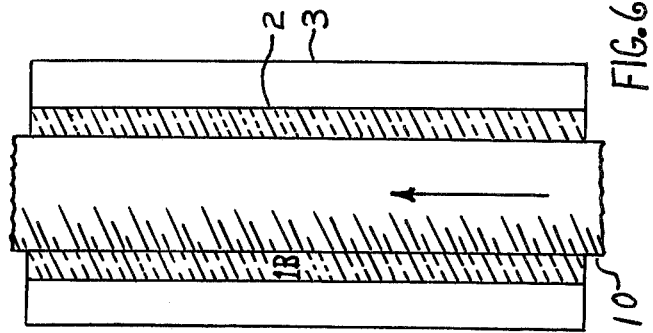

EVACUATED-TUBE SOLAR COLLECTOR

This invention is related to pending application U.S. Ser. No. 819,113, FIBROUS ABSORBER SOLAR COLLECTOR filed 07/26/77, abandoned. The absorber and general design of its ducts are common to both inventions.

All known evacuated-tube type solar collectors employ flat plate collector absorbers. The collectors are expensive and heavy. They are efficient only when using a liquid transfer agent and are difficult to manufacture.

My invention decreases and in cases eliminates the above objections. The invention is adapted to variation. The solar collector has a highly absorptive radiation absorber for all rays impinging it in each variation. The abosrber is constructed thick enough to absorb all rays contacting it.

In all the versions of this invention, fluid (air, other gas or liquid) is in contact with an interstitial body that has tissue which may be comprised of great numbers of fibrous cylindrical surfaces comprising the fibrous absorber of this collector; and having a collective surface area several times the surface area of a flat plate absorber including its fins if so equipped. This fluid conducts heat from the fibers and transfers it. Thus, its depth and great surface area provide for high efficiency in the essential critical requirements and properties desirable in a solar collector absorber.

In one of the variations, the absorber fluid is confined to within the absorber and a tube containing a fluid transfer agent absorbs heat from the fibrous absorber. In this, the absorber's fibers are compressed to opacity substantially over the outer surface of a tube or tubes of liquid located in the absorber duct. This tube is located to extend through at least one end of the collector and may extend entirely through the collector paralleling the collector. The hard packed fibrous absorber heats the tube through re-radiation, connection and conduction. The outer surface of the tube may be selectively coated to better take the re-radiation.

The collector's first cost is low because it is simple and easy to manufacture and contains economical materials. It is lightweight because of its simplicity and porous absorber structure. Its great absorber surface area results in corresponding ability to absorb solar radiation.

The absorber material may be rock wool and slag wool. These are very economical and may be arranged in a mass loose enough for good fluid passage or packed in a tight mass for heating a fluid in a center duct. New wools with stiffer fibers than now available may have liquid pass through the fibrous absorber as a transfer agent or medium.

There are many types of rock and slag wools because of the many types of rocks, slags, and their mixtures. Applicant uses a dark, substantially black rock wool as a thermal absorber. Being naturally and permanently dark in color and having varying amounts of metallic and other type particles called shot attached firmly to most every fiber by its magnetic oxide covering, the rock wool does not require blackening to be a good absorber. The rock wool used by applicant is made from slag. The manufacturer of this wool has sold its slag wool as rock wool for several years. Some authorities include slag wool as rock wool while others accord slag wool separate status as a mineral wool. Applicant includes slag wool as rock wool as does the 1971 library size edition of the Merriam-Webster Dictionary. The characteristics of applicant's rock wool is: It remains stable against efficient air recovery speeds by natural friction between its fibers. It is durable by its natural thin layer of tough magnetic oxide $Fe_3O_4$. This layer is formed about all the fibers and about the small particles of metals that attach to each fiber. It is prevented from rusting and color degradation by this natural coating formed at time of manufacture. It readily conducts heat and re-radiates less than flat plates because fibers entrap radiation. Ceramics and other expensive coatings are not required in this invention.

Rock wool can be made with special thermal absorbing characteristics not now characteristic or desirable of thermal insulation rock wools. These better absorbing characteristics include increased blackness, stiffer fibers, increased number of metallic particles attached to the fibers, a greater amount of metal in the particles and smaller sized particles. The stiffer fibers are necessary for better arrangement of densities as will be seen and when liquids are used as the transfer agent in contact with the fibers.

The absorber is disposed inside a transparent tube of highly acceptable critical properties for solar collecting. About this tube, an outer tube of like quality is fitted, and sealed to the inner tube so the common space between their walls may be evacuated of air to decrease convection.

A reflector may be used inside the evacuated area for increased life of the reflector or outside the collector for the purpose to re-direct those rays that pass to each side of the absorber. The reflector is shaped to direct these rays to the absorber.

The absorber is equipped with fluid ducts to control the fluid recovery speeds at selected depths of the absorber. The depth of greatest heating within the absorber depends on its thickness, density and speed of fluid flow past the fibers. Fluid enters the cool fluid duct end of the absorber and collector, replaces fluid between the fibers that has been warmed by them and exits via the warm fluid duct located at the other end. The length and diameter of the collector is dependent on density of absorber, rate of fluid recovery, operating temperature, and other features as will be seen.

In the tube transfer agent type collector, the absorber is compacted fiber disposed between the inside surface of the inner transparent tube and the outside surface of the tube carrying the fluid transfer agent. The fibrous absorber may be sealed at each end to retain the fluid, air or liquid, within the absorber and in contact with the transfer agent tube.

Several collectors may be ganged in parallel to form an assembly. Their cool input ends may have a common manifold or duct; so may their output ends. Each manifold would support one end of the collectors and their transfer agent would flow in the same direction approaching the inputs and departing the outputs for equilization of flow between the collectors. Ganging in series may be used to increase the temperature for refrigeration application.

One of the important purposes of applicant's invention is to control and direct fluid flow for increasing the rate of flow through the absorber where the greatest thermal heating occurs. The density of the absorber determines depth to which heating occurs, but this depth is modified by convection currents, re-radiation, the amount of heat accumulated, the distance between ducts, length of absorber and the speed of fluid recovery. With rapid recovery, greater efficiency results. Applicant's absorber ducts are located as required to channel the transfer fluids for greatest efficiency. They may occupy parts of the absorbers such as ends, center and sides of the absorber. They are shaped to occupy absorber volume and decrease absorber resistance in selected areas or to shorten the distance between opposite ducts thereby decreasing absorber resistance to fluid flow for increased flow at selected absorber depth at which greatest heating occurs. Extensive tests show this control contributes to making this fibrous absorber a practical absorber. Without this ducting, it is not practical.

A primary object of the invention, therefore, is to provide a solar collector that is practical in price and use while converting solar radiation to heat in air or other suitable gas or in liquid for passive or active heating and cooling of buildings. Other objects, features and advantages of this invention include applications of its highly efficient absorber and the collector's simplicity of structure, economical manufacture, durability, lightweight, and others as will become more apparent upon reference to the succeeding detailed description thereof, and to the drawings illustrating the preferred embodiments thereof; wherein, FIG. 1 is a cross sectional end view showing arrangement of parts of an embodiment of the invention.

FIG. 2 is a cross sectional top view of the embodiment in FIG. 1.

FIG. 3 and FIG. 4 are similar views of a second embodiment of the invention.

FIG. 5 and FIG. 6 are similar views of a third embodiment of the invention. Other embodiments result from combination of the drawings.

Only essential details of construction and operation of the collector per se are given as they are known and are therefore believed to be unnecessary for an understanding of the invention.

FIG. 1 and FIG. 2 show a loose density fibrous absorber 1 that permits deep sun penetration. Fluid passes through the absorber at selected design speeds and depths for optimum removal of heat concentrations.

FIG. 3 and FIG. 4 show increased fiber density in the fibrous absorber 1A, otherwise similar to 1. Increased density provides opacity near its surface requiring a change in absorber duct design compared to the duct in 1. Ducting may be assisted by plug 9 which, when employed, forces the transfer fluid circumferentially through the outer portion of 1A for optimum removal of its heat.

FIG. 5 and FIG. 6 show further increased density of fibrous absorber 1B in comparison to 1A. Absorber 1B may be hard packed to provide opacity very close to its surface but not so close as to provide insulation in the rear part of the absorber sleeve to grid or tube 10 containing a majority of or all of the transfer agent. 1B must be dense enough to provide a thin re-radiating body when 10 is a tube, yet provide some convective fluid movement and conduction when necessary for optimum heating of tube 10 and its contents.

Absorber fibers may be fixed in selected densities by adhesive or grids in the absence of stiff, non-resilient type rock wool that is needed to remain stable in loose density arrangements in gas such as air and more particularly in liquids.

Absorber 1 is disposed within inner tube 2 which is disposed within outer tube 3. The walls of both tubes are separated, and sealed on their ends for evacuation of air therebetween to decrease convective air currents for absorber efficiency. 2A is the collector duct for connection to other collectors in series or via manifold. The manifold may connect to the collector at other locations negating the need for 2A.

Reflector 4 may be placed inside the evacuated area for longer life or placed exterior to the outer tube. It reflects those rays that penetrate the collector but miss the absorber. Deflector 5 may be used when the surface of 4 is too smooth to adequately reflect all rays back to absorber 1.

Absorbers 1, 1A and 1B may be structurally arranged to provide ducts for transfer agents, by decreased density at selected depths, by shape change to remove fibers to change resistance to fluid flow, by barrier plug to flow, or shaped for the insertion of a tube carrying the transfer agent. To illustrate, absorber 1 is shaped on both ends in a concave manner as shown in FIG. 2 to decrease the resistance at selected depths to provide the desired absorber ducting of transfer fluid through highest heat concentration depths. Duct 6 is only one of the possible shapes. The arrows indicate the fluid recovery speeds for this shape.

Absorber 1A also may be shaped in a concave manner on its ends or on its sides or both. FIGS. 3 and 4 show it concave on its sides with plug 9 optional for assisting the circumferential flow about 1A. The plug may, however, be used alone to channel the flow. When the density of 1A is increased greater than as in 1, its center will not heat and will permit a bypass of unheated fluid. Plug 9 is one method of accomplishing this. The change in density controls the areas through which the ducts must be routed; the more dense the fiber, the less distance the penetrations of the rays. The absorber fiber may be decreased in density or shaped by complete removal or combination of both when forming ducts in fiber. This arrangement in different numbers of fibers, for different resistance to flow, usually results in the greatest fluid recovery near the upper portions of the collector. Spacer 8 may support grid 7 which may support the fiber of 1A when fiber is removed to form the duct. Tests show large mesh in the grid permits the fibers to protrude into the ducts increasing fluid turbulence for increased flow at a given depth. The lengths of arrows in FIG. 4 indicate the relative fluid recovery speeds at selected depths. 2B may be used as the collector duct similarly to 2A.

Absorber 1B also may be shaped to permit a duct. When its fibers are packed firmly enough to permit very little fluid movement between its fibers, the absorber duct may be formed exterior the absorber or interior the absorber as shown in FIGS. 5 and 6. With present day fibers available, the fibers are not stiff enough to assist in decreasing the capillary attraction resistance to flow, when liquids are used, or to form and retain themselves in a desirable shape without assistance. This assistance is tube or grid 10. It may be a grid that permits its fluid to penetrate the absorber for some movement therein. Such movement indicates improved results, in limited tests, over the use of a tube to line this duct which does not permit mixing of fluid with that in the absorber. When a tube is used to line the duct, the absorber may contain a different fluid, air, other gas or liquid, than the fluid transfer agent carried by the tube. When variable pressures, high temperatures and expensive fluids are used as in refrigeration; the tube may be essential. In this case, absorber 1B is sealed to retain its fluid between tube 2 and tube 10. Absorber 1B absorbs the sun's radiation, re-radiates to tube 10 and the fluid between the absorber fibers. Tube 10 also receives heat from conduction through the absorber fluid and a small amount of convection of that fluid. Small scale tests have been made using a greater amount of rock wool metallic and other slag particles, that attach to the fibers, than normally produced as a part of rock wool. The tests indicate improved performance in 1B application over when 1B is constructed from regular production type wool of good absorbing qualities available to applicant.

While the invention has been described and shown in its preferred embodiments, it will be clear to those skilled in the arts to which it pertains that many changes and modifications may be made thereto without departing from the scope of the invention.

I claim:

1. In an elongated tube-evacuated solar collector: a collector inner tube and a collector outer tube, the inner tube disposed within the outer tube, both tubes transparent and sealed for evacuation of air in the common space between their walls; a natural dark substantially black mineral wool fibrous absorber with spaces for fluid between its fibers disposed in proximity to substantially all the inner surface of the wall of the inner tube; duct means for venting a fluid transfer agent into the collector, through the absorber and out of the collector; the duct means includes absorber duct means formed by absorber fiber arrangement for venting the transfer agent through the absorber substantially parallel to its axis; and reflector means to re-direct radiation entering the lower evacuated area back to the absorber.

2. The invention of claim 1, wherein the spaces between the fibers are filled with the fluid transfer agent, and the absorber duct means further includes the absorber arranged with different numbers of its fibers to cause different resistances to fluid flow at selected absorber depths for channeling the transfer agent through depths of the absorber of greatest energy absorption.

3. The invention of claim 2, wherein the different numbers of fibers result from the absorber arranged in different fiber densities.

4. The invention of claim 2, wherein the different numbers of fibers results from different absorber shapes.

5. The invention of claim 1, wherein the spaces between the fibers are filled with the fluid transfer agent, and the absorber duct means includes plug means located in the absorber for channeling the transfer agent exterior the plug and through depths of the absorber of greatest energy absorption.

6. The invention of claim 1, wherein the absorber duct means penetrates the absorber substantially parallel to its axis.

7. The invention of claim 6, wherein the absorber duct means further penetrates the absorber in its outer circumferential depths, and the spaces between the fibers are filled with the fluid transfer agent.

8. The invention of claim 6, wherein the absorber duct means further penetrates the absorber approximate its center.

9. The invention of claim 8, wherein an absorber stabilizing means; and the absorber stabilizing means assists in shaping the absorber duct means, and the spaces between the fibers are filled with the fluid transfer agent.

10. The invention of claim 8, wherein a fluid transfer agent tube means; the fluid transfer agent tube means is fitted in the absorber duct means to carry the fluid transfer agent, and the spaces between the fibers are filled with a fluid mechanically sealed within the space between the collector inner tube and the transfer agent tube.

11. The invention of claim 1, wherein the reflector means is located within the lower evacuated area, and includes a reflecting shield and a light deflector positioned to assist the reflecting shield.

12. The invention of claim 1, wherein the mineral wool is specially manufactured type rock wool with special thermal absorbing characteristics, and these special characteristics include increased blackness, stiffer fibers, and increased number, more uniform size and more metal content in the metallic particles attached to the fibers.

* * * * *